United States Patent [19]
Kikuchi et al.

[11] Patent Number: 5,132,809
[45] Date of Patent: Jul. 21, 1992

[54] IMAGE DISPLAY APPARATUS

[75] Inventors: Tetsuo Kikuchi, Yokohama; Hiroaki Suzuki, Hachioji, both of Japan

[73] Assignee: Canon Kabushiki Kaisha, Tokyo, Japan

[21] Appl. No.: 480,850

[22] Filed: Feb. 16, 1990

[30] Foreign Application Priority Data
Feb. 17, 1989 [JP] Japan .................................. 1-37713

[51] Int. Cl.⁵ ............................................. H04M 1/32
[52] U.S. Cl. ..................................... 358/403; 358/214; 358/444
[58] Field of Search ............... 358/403, 214, 404, 444

[56] References Cited
U.S. PATENT DOCUMENTS
4,513,390 4/1985 Walter et al. ..................... 358/403
4,768,099 8/1988 Mukai .............................. 358/403

Primary Examiner—Edward L. Coles, Sr.
Attorney, Agent, or Firm—Fitzpatrick, Cella, Harper & Scinto

[57] ABSTRACT

An image display apparatus includes a moving device for moving desired data on an image recording medium, on which image data and index data are recorded, to a read-out position, and a reader for reading data located at the read-out position and generating an electric signal corresponding to the read-out data. A memory stores data read by the reader and includes a first memory for storing image data and a second memory for storing index data. In addition, a display selectively displays data stored in one of the first and second memories.

7 Claims, 5 Drawing Sheets

IMAGE DISPLAY APPARATUS

BACKGROUND OF THE INVENTION

1. Field of the Invention

This invention relates to an image display apparatus, in which image recorded on an image recording medium such as microfiche is read out with an image sensor or the like and displayed on a display section, and more particularly, to image recording apparatus which permits desired images to be retrieved according to index data on an image recording medium to display retrieved image.

In an analog-type reader/printer for displaying image recorded on a microfiche as image recording medium, by inserting the image recording medium between two glass plates of an X-Y carriage movably provided on a reader/printer body, the X-Y carriage starts to be moved, and an index frame of image recording medium, in which index data is recorded, is projected onto an optical screen when the index frame is located in a projecting optical path. The operator searches the frame number of a desired image frame while looking at index data and inputs that frame number to a keyboard. As a result, the X-Y carriage is moved to locate the desired image frame on the projecting optical path, and the desired image is enlargedly projected on an optical screen. Then, if it is intended to refer to the index frame for observing a different image frame, the X-Y carriage is moved again by turning on an index switch provided on the keyboard. As a result, the index frame is located on the projecting optical path, and index data is projected again on the optical screen.

The analog type reader/printer noted above has to be provided with a large size optical screen for it is necessary to enlarge an image frame of the image recording medium to a size close to the original size and confirm the image data. Therefore, size increase of the apparatus is a necessary liability.

Further, in the analog process it is difficult to process image data freely.

Recently, a digital reader/printer has been proposed, in which an image frame on microfiche is read out with an image sensor or the like, and the read-out image is stored in an optical disk or like memory while it is displayed on a CRT or like display.

With this digital reader/printer, in which the read-out image is displayed on the CRT or like display, no large size screen is necessary. In addition, since the read-out image is stored as digital data, it is possible to obtain various processes of image data.

However, with the prior art analog system noted above, the index data can be instantly referred by merely moving the index frame to a predetermined position of projection with an X-Y stage moved by turning on an index switch. With the prior art digital system noted above, for referring to index data it is necessary to perform a reliable reading operation after the index frame has been moved to a predetermined reading position with movement of an X-Y carriage.

In the retrieval of microfiche, generally index data is referred to very frequently, and the arrangement which permits reference to index data only after reading of the index frame performed subsequent to the movement of the X-Y carriage reduces the efficiency of the retrieval operation, and the advantage of capability various processes of image data can not be substantially made use of.

The present invention has been intended in order to solve the problems in the prior art, and its object is to provide an image display apparatus, which permits digital image processing and can instantly display index data.

Another object of the invention is to provide an image display apparatus, which can display a desired image on an image recording medium in a short period of time.

A further object of the invention is to provide an image display apparatus, which can display image data and index data recorded on an image recording medium with reduced wasteful operation and hence with improved efficiency to permit search a desired image in a short period of time.

To attain the above objects of the invention, there is provided an image display apparatus, which comprises moving means for locating a desired image on an image recording medium to a read-out position, reading means for optically reading out an image and generating an electric signal corresponding to the read-out image, and display means for displaying image stored in the memory means. The memory means includes a first memory for storing image data and a second memory for storing predetermined index data on the image recording medium, and the display means selectively displays data stored in either the first or second memory.

The second memory suitably has a memory capacity of storing images for two or more frames.

Further, suitable index data is stored in the second memory immediately after loading of the image recording medium.

Further, it is possible to change data stored in the memories.

With the construction noted above according to the invention, in which a first memory for storing an image read out by reading means and a second memory for storing index data are provided, no reading operation has to be performed for every index data display.

BRIEF DESCRIPTION OF THE INVENTION

DETAILED DESCRIPTION OF THE PREFERRED EMBODIMENT

Figure 1:
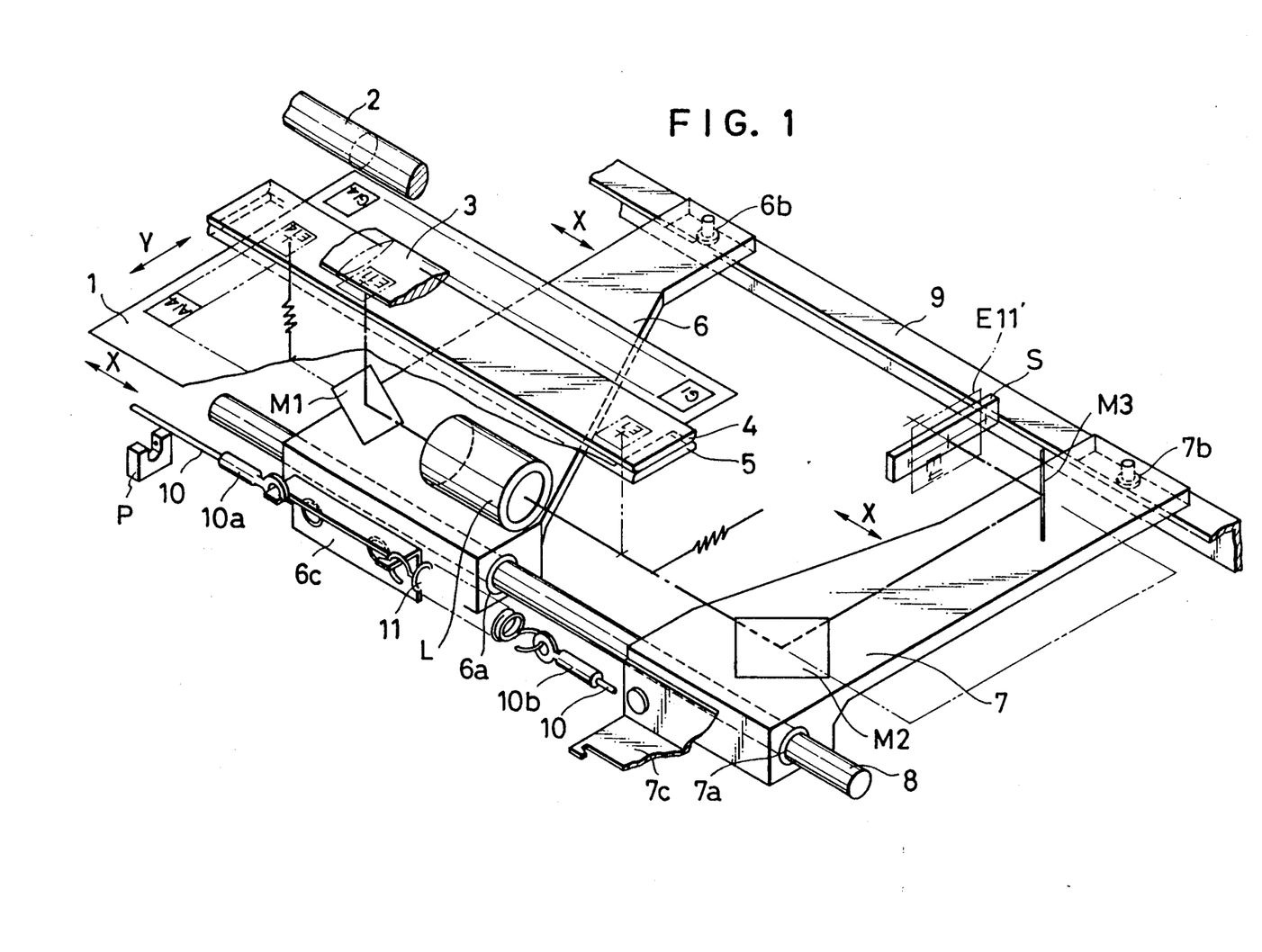
FIG. 1 is an exploded perspective view showing an essential part of an embodiment of the invention.

A first embodiment of the invention will be described with reference to FIGS. 1 to 4, and its construction will be described with reference to FIGS. 1 and 2.

Reference numeral 1 designates microfiche as the image recording medium. This image recording medium is a sheet of microfilm, on which a plurality of images (hereinafter referred to as image frames) A1 to A14 and B1 to B14 are recorded on a reduced scale. Reference numeral 2 designates a fluorescent lamp as an elongate light source disposed such as to extend in the longitudinal direction of the image recording medium 1. Reference numeral 3 designates a field lens having a shape of a cylindrical lens, which is disposed between fluorescent lamp 2 and clamping glass plates 4 and 5 having the image recording medium 1 clamped therebetween and has its lens characteristics only with respect to a direction perpendicular to the longitudinal direction of fluorescent lamp 2. Fluorescent lamp 2 and field lens 3 provide uniform illumination to all frames E1 to E14 in a particular line of image recording medium 1. Designated at L is a projecting lens. Image recorded on a frame of image recording medium 1 is reflected by first mirror M1 and focused on the surface of image sensor S as reading means through projecting lens L and second and third mirrors M2 and M3.

First mirror M1 and projecting lens L are secured to lens base 6, and second and third mirrors M2 and M3 are secured to mirror base 7. Image sensor S is secured independently of lens base 6 or mirror base 7. Lens base 6 and mirror base 7 have one end slidably supported on common shaft 8 via respective bearings 6a and 7a. Their other end is slidably supported by common guide 9 for positioning in the direction of rotation about an axis and for axial displacement. They are provided with respective sliders 6b and 7b in contact with guide 9 for providing improved sliding characteristics. Reference numeral 10 designates a drive wire, which is coupled by wire hook 10a to one end of wire coupling member 6c secured to lens base 6. To the other end of wire coupling member 6c is coupled tension spring 11, which is in turn coupled by wire hook 10b to wire coupling member 7c secured to mirror base 7. A reference position (hereinafter referred to as home position) of lens base 6 is determined by home position sensor P. Drive wire 10 is coupled to an X direction drive motor to be described later, and it is moved in the X direction shown by arrows with forward and reverse operation of the X direction drive motor, thus moving lens and mirror bases 6 and 7 in X directions. In this way, mirror M1 may be brought to selectively face one of frames E1 to E14 arranged in the X direction. By moving lens and mirror bases 6 and 7 along shaft 8 and guide 9, a selected image frame in a particular column on image recording medium is located at a read-out position, and the image of the frame is projected onto image sensor S.

Image recording medium 1 is clamped between paired feed rollers (not shown), and with rotation of these feed rollers it is fed in a Y direction shown by arrows. In this way, one of the frames arranged in the Y direction can be selectively brought to a read-out position between light source 2 and first mirror M1. The feed rollers can be driven forwardly and reversely by a Y direction drive motor to be described later.

Thus, a desired image frame on the image recording medium can be brought to a read-out position by driving the X and Y direction drive motors.

Figure 2:
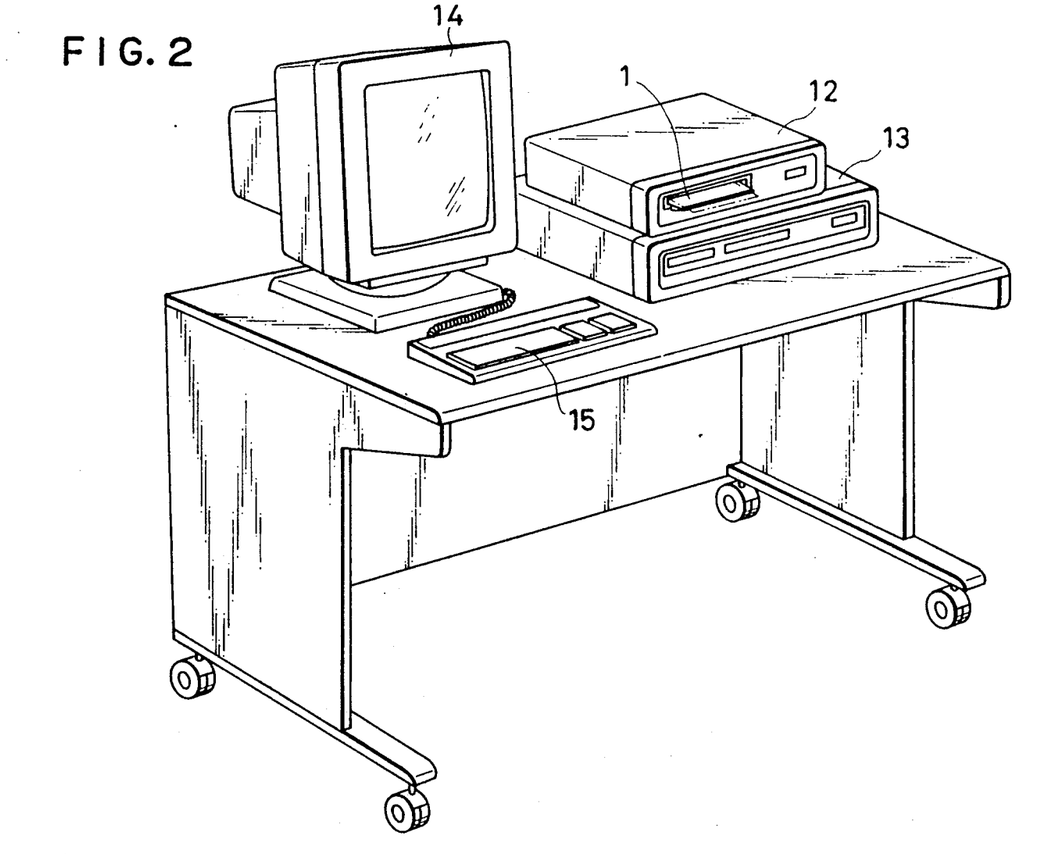
FIG. 2 is a perspective view showing the overall structure of the invention.

FIG. 2 shows the appearance of the image display apparatus. Reference numeral 12 designates a reading section having a front panel with an opening for inserting image recording medium 1. Reference numeral 13 designates a host section, which includes image and buffer memories 18 and 19 as memory means for storing image data read out by reading section 12 and also a MPU for performing various controls. Reference numeral 14 designates a display such as a CRT or a liquid crystal display plate as display means, and it can display image for one frame. Reference numeral 15 designates a keyboard for inputting necessary data such as a frame number to be searched, 21 an X direction drive motor coupled to wire 10, and 22 a Y direction drive motor coupled to the feed rollers.

Image memory 18 is constituted by an optical disk or the like and can store image of each image frame on image recordig medium 1.

Buffer memory 19 has a storage capacity for two images of first and second areas 19a and 19b, and it can store the index frame.

Figure 5:
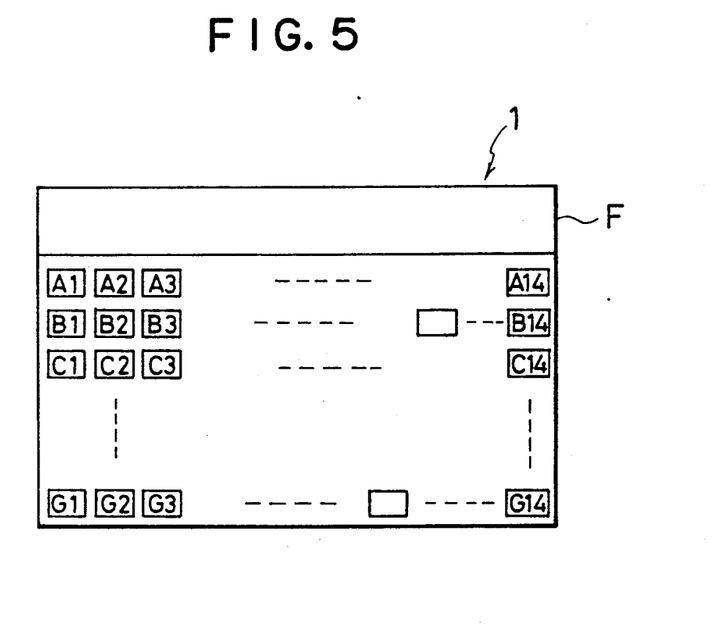
FIG. 5 is a view showing an example of an image recording medium.

Image recording medium 1, as shown in FIG. 5, has a plurality of frames A1, A2, . . . , G14, which are arranged in a form of matrix on card-like film F, and on which image data is recorded. Index data is recorded in at least frame G14 in the last row and column among the plurality of frames.

As index data, index contents of image data recorded in the individual frames are recorded as a list in index frame G14.

Further, in index frame G14 the contents recorded in the plurality of image frames A1, A2, . . . , G13 are recorded collectively as data capable of ready retrieval. For example, retrieval data for document table, document register's names, keywords, document titles and classification corresponding to the individual image data and image addresses (frame numbers) are recorded as index data.

When searching desired image, index data is read out and is displayed on the display section. The operator refers to the displayed index data to search retrieval data corresponding to a desired image and knows an image address corresponding to the desired retrieval data. Then, by inputting the image address thus obtained to a keyboard to be described later, the image frame of the input image address is automatically retrieved at the read-out position, and image data recorded in this image frame is read out by an image sensor to be displayed on the display.

Figure 3:
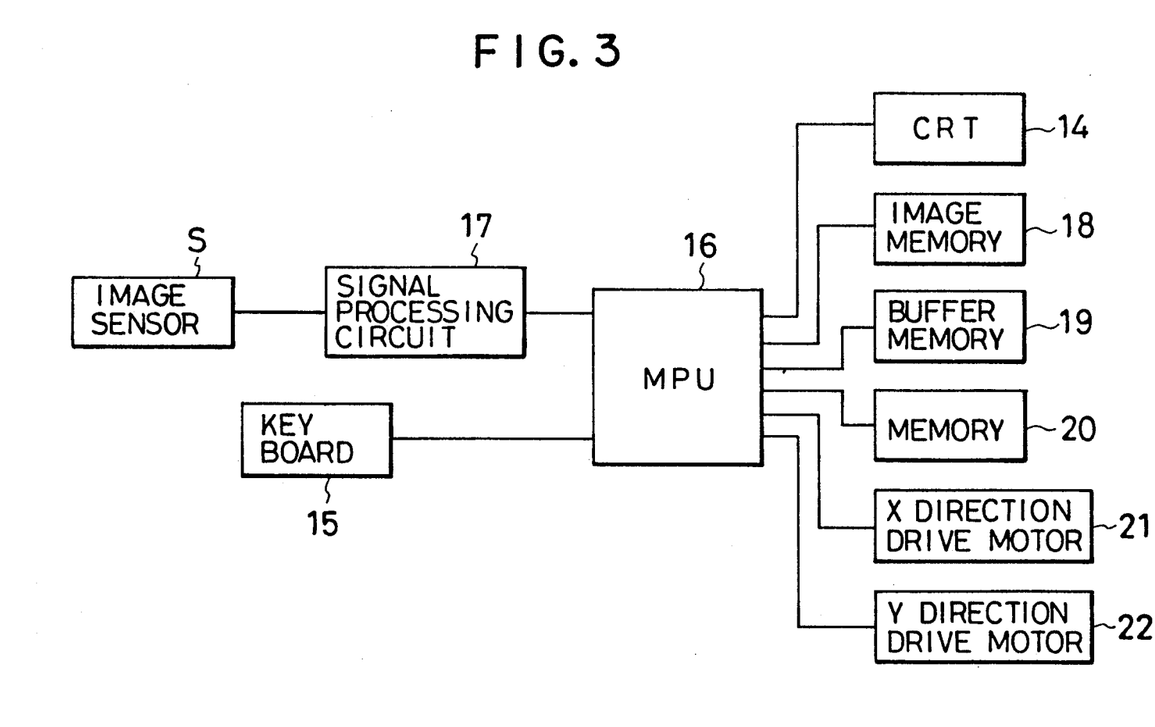
FIG. 3 is a block diagram showing a control structure of the embodiment.

Now, the structure of control according to the invention will be described with reference to the block diagram of FIG. 3.

Reference numeral 16 designates an MPU consisting of a microcomputer for controlling the entire system. Reference numeral 17 designates a signal processing circuit including an A/D converter for digitally converting an analog signal from image sensor S, 20 a memory such as a RAM or a ROM utilizing MRU 16 other than video memory such as image memory 18 and buffer memory 19, and 21 and 22 X and Y direction drive motors.

Figure 4:
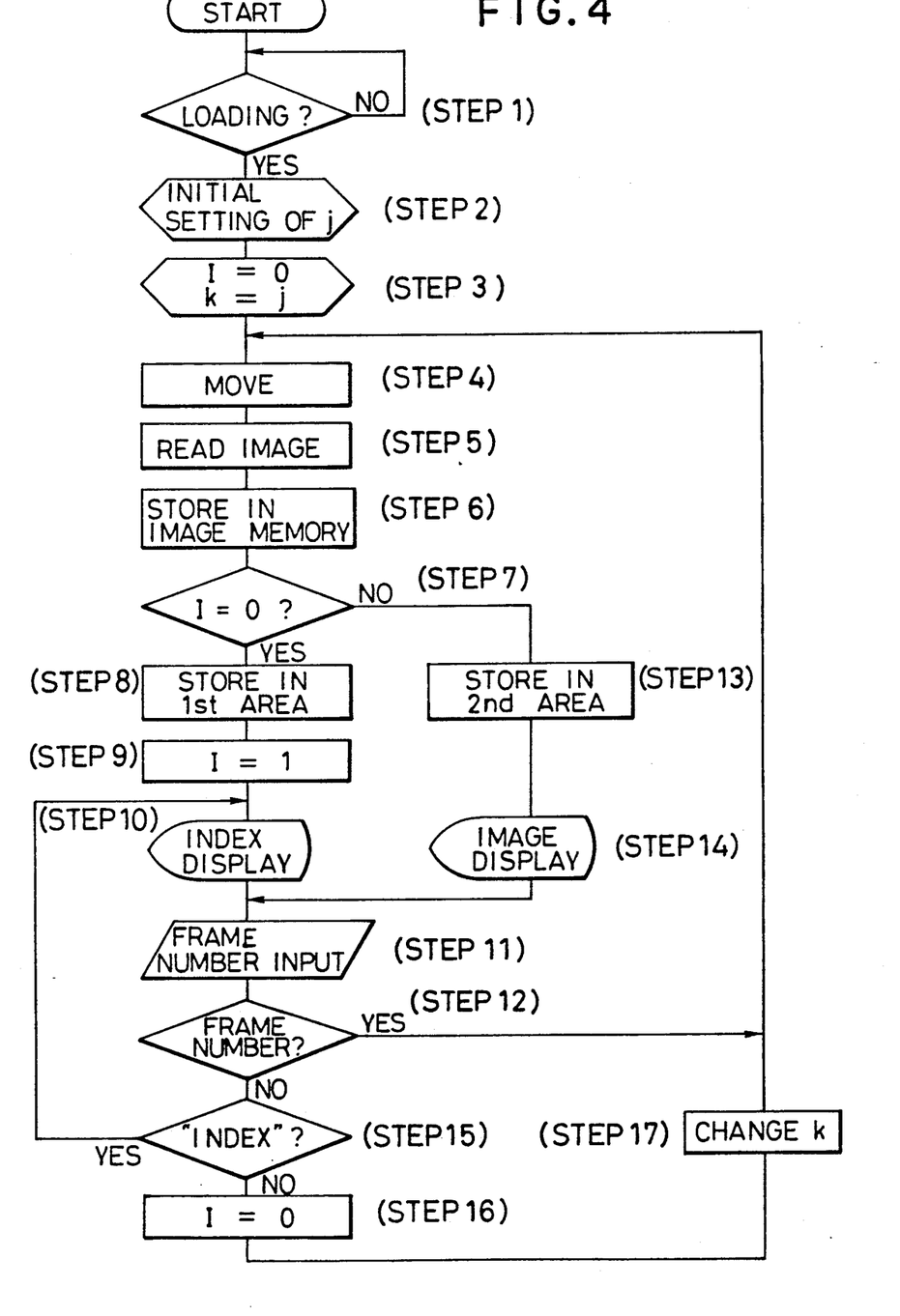
FIG. 4 is a flow chart illustrating a control operation of the embodiment.

An example an operation of the embodiment will be described with reference to the flow chart of FIG. 4. First, microfiche 1 as the image recording medium is loaded through insertion opening of reading section 12 (STEP 1). As a result, host section 13 effects initial setting of internal variable j according to the contents of memory 20, in which a value of image recording medium of high frequency of use (usually a value of index frame) is stored as default value (STEP 2). Further, it clears internal variable I and initializes variable k with variable j (STEP 3). The variable I here is a flag, and variable k means frame numbers of image frames A1 to G14 to be read out. (The default value in this case is k=G14). Lens base 6 at this time is held at its home position by home position sensor P. At this time, host section 13 effects movement of a predetermined image frame (i.e., index frame G14) to a reading position by providing an extent of driving corresponding to a quotient of division of the value of variable k by the number of rows of image frames A1 to G14 on the microfiche 1

(i.e., 14 in this case) to Y direction drive motor 22 noted above, which is coupled to the feed roller for feeding image recording medium 1 and providing an extent of driving corresponding to the remainder to X direction drive motor 21 for moving lens base 6 (STEP 4). Then, it reads out data in this index frame (STEP 5) and stores index data stored in this frame in image memory 18 (STEP 6). Then it checks the value of variable I as index flag (STEP 7). At this time, variable I is zero, that is, index frame G14 has been read out. Host section 13 thus stores index data in first area 19a of buffer memory 19 (STEP 8) and changes Zvariable I to 1 (STEP 9). Then it supplies index data in first area 19a of buffer memory 19 to display 14 for index display (STEP 10). It searches the number of the frame where there is desired image with reference to the index data displayed on display 14 and supplies the desired frame number from keyboard 15 (STEP 11). Then, it checks whether character data supplied from keyboard 15 represents the frame number (STEP 12). Since in this case the data represents the frame number, it executes steps 4 through 6 according to the value of variable k. In the execution of step 7 at this time the value of variable I has been changed to 1, the desired image data in image frame read out in step 5 is stored in second area 19b of buffer memory 19 (STEP 13), and image data stored in second area 19b of buffer memory 19 is displayed on display 14 (STEP 14). Then, if a frame number to be sought is known, host section 13 repeatedly executes steps 11, 12, 4, 5, 6, 7, 13 and 14 by supplying the frame number, and in this way the desired frame image data is displayed on display 14.

If the frame number to be sought becomes unknown so that it is desired to refer to index data, in step 11 the "Index" key provided in host section 13 is depressed. In consequence, when a check is done in step 12 as to whether the "Index" key is depressed (STEP 15), if "index" key is depressed, then step 10 is executed, whereby index data is displayed instantly.

For the image data displayed in step 10 a default value (in this case index frame G14) has been designated. If this value is not a desired one, shift amounts are set before depressing the "Inde" key in the execution of step 11. In consequence, after steps 12 and 15 the internal variable is cleared (STEP 16), and the value of variable k is changed according to the shifts thus set (STEP 17). Then, through subsequent execution of steps 4 through 10 desired frame image data is displayed on display 14.

It is possible to change the default value, if necessary.

The display 14 has generally visually permissible lower limit resolution due to such factors as memory capacity, and thus it is low compared to reading means. Accordingly, the contents displayed on display 14 can be dealt with as adequately thinned-out data in a range permitting visual discrimination. That is, by thinning out image displayed on display 14 it is possible that the capacity of the memory storing image data is small compared to the instant embodiment and that the image read-out speed is increased.

Usually, index data all represent characters or numerals, and it is possible to convert read-out images into codes through character recognition and then develop the codes into images for storage in buffer memory 19.

Once index data is read out, there is no need of executing reading operation every time index data is displayed. Thus, when it is desired to have reference to index data during search, the index data can be instantly displayed by merely loading the memory.

It is thus possible to eliminate wasteful time concerning the frame movement and reading operation that has been necessary with the prior art digital system image reader, thus permitting great improvement of the operability during search of frame in an image recording medium.

In the above embodiment, the search of the desired frame is effected through the feeding of the image recording medium and movement of the optical system for reading. However, it is possible to effect the search by setting the image recording medium on a carriage capable of movement in X and Y directions and moving the carriage with the image recording medium thereon in X and Y directions to bring the desired frame to the reading position.

What is claimed is:

1. An image display apparatus, comprising:
   moving means for moving a recording medium to locate a selected area on the recording medium to a read-out position, the recording medium having a plurality of image areas on which image data is recorded and index areas on which index data for retrieving the image data of each image area is recorded;
   reading means for reading the data of the selected area on the recording medium located at the read-out position and generating an electric signal corresponding to the read data;
   memory means for storing the data read by said reading means, with said memory means being capable of storing data from the image areas and the index areas;
   display means for displaying data stored in said memory means;
   first designating means for designating index data stored in said memory means to be displayed by said display means;
   second designating means for designating an address of a desired image area, with the address being obtained by the index data displayed by designation of said first designating means; and
   control means for controlling said moving means to locate the image area corresponding to the address designated to said second designating means to the read-out position.

2. The image display apparatus according to claim 1, wherein said moving means includes transfer means for transferring the recording medium in X and Y directions.

3. The image display apparatus according to claim 2, further comprising optical means for projecting an image on the image recording medium onto said reading means and drive means for driving said optical means along the image recording medium.

4. The image display apparatus according to claim 1, wherein the image recording medium is a microfiche, and index data is recorded on at least one frame of the microfiche.

5. A retrieval apparatus which uses a film having a plurality of frames on which image information is recorded and frames on which index information for retrieving the image information of each of the plurality of frames is recorded, comprising:
   reading means for reading information recorded on the frame located in a read-out position;

moving means for moving the film to locate a selected frame to the read-out position;

memory means having a first memory for storing index information read by said reading means and a second memory for storing at least one image information read by said reading means;

display means for displaying information stored in said memory means;

first designating means for designating index data stored in said memory means to be displayed by said display means;

second designating means for designating an address of image information to be retrieved, with the address being obtained form the index information displayed by said display means; and control means for controlling said moving means to locate the image information to be retrieved corresponding to the designation by second designating means to the readout position.

6. A display apparatus for displaying information of a film having a plurality of frames on which image information is recorded and frames on which index information for retrieving image information of each frame is recorded, comprising:

reading means for reading information recorded on the frame located in a read-out position;

moving means for moving the film to locate a frame on the film to the read-out position;

controlling means for controlling said moving means to start movement of the film when the film is located at a predetermined position and locate the frame containing index information to the read-out position;

memory means having a first memory for storing index information read by said reading means and a second memory for storing the read image information; and display means for displaying information stored in each memory.

7. An apparatus according to claim 6, wherein the film is microfiche.

* * * * *

UNITED STATES PATENT AND TRADEMARK OFFICE
CERTIFICATE OF CORRECTION

PATENT NO. : 5,132,809

DATED : July 21, 1992

INVENTOR(S) : Tetsuo Kikuchi, et al.

It is certified that error appears in the above-identified patent and that said Letters Patent is hereby corrected as shown below:

COLUMN 5:

Line 12, "Zvariable" should read --variable--.

COLUMN 6:

Line 47, "to" (first occurrence) should read --by--.

COLUMN 7:

Line 14, "form" should read --from--.

Signed and Sealed this

Twenty-first Day of September, 1993

Attest:

BRUCE LEHMAN

Attesting Officer

Commissioner of Patents and Trademarks